UNITED STATES PATENT OFFICE.

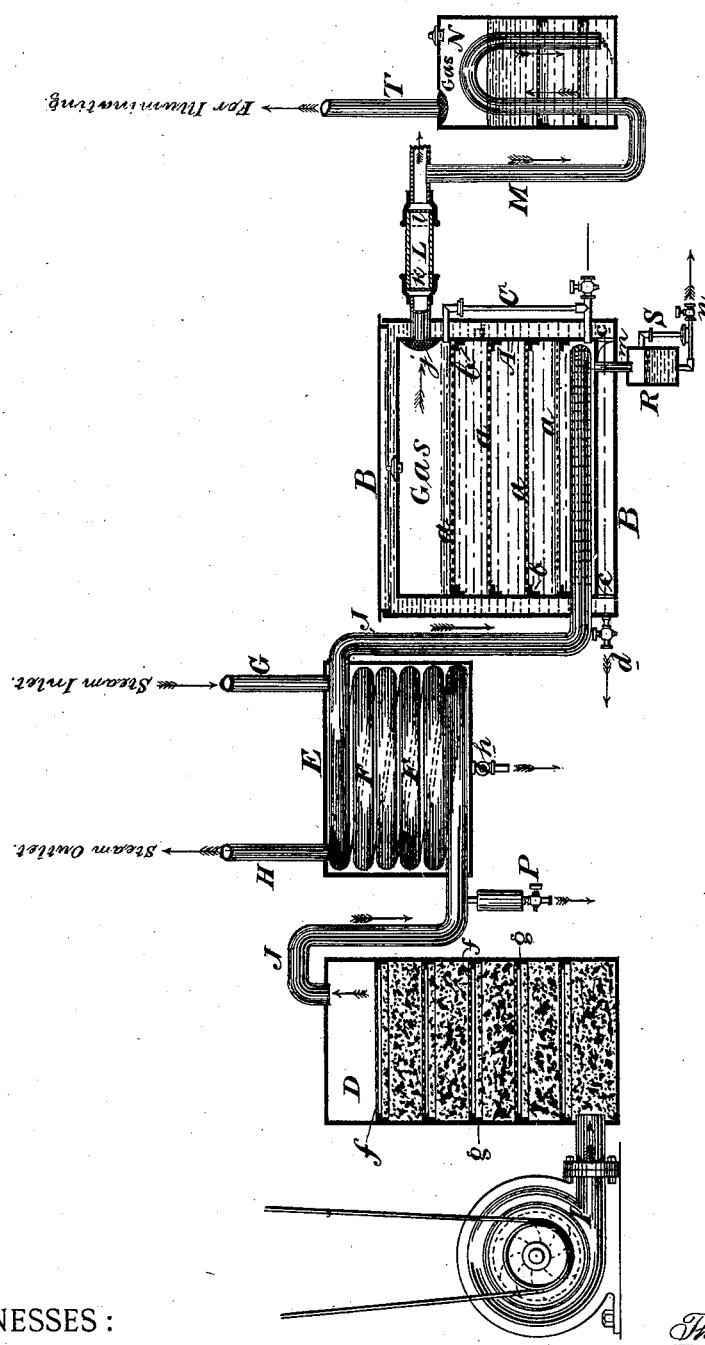

THOMAS DRAKE, OF HUDDERSFIELD, COUNTY OF YORK, ENGLAND.

CARBURETING APPARATUS.

SPECIFICATION forming part of Letters Patent No. 370,936, dated October 4, 1887.

Application filed August 19, 1886. Serial No. 211,337. (No model.) Patented in England June 9, 1886, No. 7,733.

*To all whom it may concern:*

Be it known that I, THOMAS DRAKE, a subject of the Queen of Great Britain, residing in Huddersfield, in the county of York, England, have invented certain new and useful Improvements in Carbureting Apparatus, (patented in England June 9, 1886, No. 7,733,) of which the following is a specification.

My invention relates to apparatus for manufacturing combustible "gas" (commonly so called) by charging atmospheric air with the vapor of a hydrocarbon oil or other volatile and inflammable liquid. The carbureted air thus produced is hereinafter referred to as a "vapor."

In practicing my invention I pump or force atmospheric air through, first, a dehydrating-vessel, whereby it is deprived of moisture, then through a heating or superheating apparatus, whereby it is heated, and finally through one or more carbureting-vessels containing some volatile hydrocarbon liquid, whereby the heated air becomes charged with inflammable vapor, and is thereby constituted a combustible vapor.

The dehydrating-vessel consists of a closed chamber containing trays holding unslaked lime or other substance having an affinity for water.

The heating apparatus consists of a vessel into which steam is admitted and a coil of pipe in said vessel through which the air is passed.

The carbureting-vessel consists of an oil-vessel inclosed by a water-jacket. In the oil-vessel is placed any suitable liquid hydrocarbon or hydrocarburet or other volatile combustible liquid that is adapted to the purpose, such as benzine, gasoline, naphthaline, &c. I prefer benzine for the purpose. The dehydrated and heated air is admitted in fine jets at the bottom of the oil-vessel and passes up through the oil, vaporizing and absorbing it, and being thus converted into combustible vapor, which may be used for heating or for illuminating purposes. If the vapor is too rich when used for heating purposes, I introduce atmospheric air at a suitable or convenient place before its combustion.

I will now describe my invention with reference to the accompanying drawing, which illustrates the apparatus in vertical longitudinal section.

I is a blower for propelling the air.

D is the dehydrating vessel or chamber containing trays of lime or other substance having an affinity for water.

E is the heating-vessel or superheater.

A is the carbureting-vessel containing the hydrocarbon oil, and N is a second carbureting-vessel.

The carbureting-vessel A is filled nearly to the top with some suitable volatile hydrocarbon oil—benzine by preference—and is subdivided by sheets of canvas, $a$, or other suitable material, attached to a frame supported upon angle-iron bars $b$, connected to the inner side of the vessel. This vessel A is hermetically sealed; but to insure that the oil therein shall not evaporate it is placed within a larger vessel, B, in which it is supported upon suitable feet, $c$, leaving a space or jacket all around, which is filled in with water or water and wood-sawdust, taps $d$ being employed to let out the water when required.

C is a gage to show the quantity of oil within the vessel A. The dehydrating-vessel D is subdivided by perforated plates $f$, resting upon angle-iron plates $g$, the intervening spaces being filled up with unslaked lime.

The heating-vessel E is a closed vessel containing a coil of pipe, F, through which the air is passed. This vessel is supplied with exhaust-steam from an engine or from other source, or is otherwise suitably heated. The steam enters at the pipe G, imparts heat to the coil F, and passes out at the pipe H. The water of condensation from the steam may be let out by the small tap $h$.

In making combustible vapor according to my invention the fan I blows air into the bottom of the vessel D, and the air passes up through the lime placed therein; but in order that it may not ascend too rapidly it is made to pass through the perforated plates $f f$. Having been thus dried, the air is passed thence through the pipe J and through the heated coil F, by which means the dried air is heated, and passes thence through the remainder of the pipe J, the end of which enters the carbureting-vessel A and extends along the bottom thereof. The pipe J within this vessel is perforated with small holes, allowing the heated dry air to escape therefrom into the lower part of the vessel A. The air now rises up through the hydrocarbon oil in this vessel; but its too rapid ascent is prevented by the sheets of canvas d, through which it passes. Thus the air becomes so charged with the oil as to be converted into combustible gas or vapor. The vapor thus made passes out from the top of the carbureting-vessel at j and flows through the pipe L to any suitable receptacle, such as a gasometer, in which it may be stored and from which it may be drawn for any heating purpose, such as to heat steam-boilers; or it may be used directly without passing it to a storing-vessel.

As the vapor so manufactured is very explosive and liable to "firing back," the end of the outlet-pipe L at point j in the oil-vessel A is covered with fine wire-gauze, as also is the pipe L at points k and l, which wire-gauze is applied in the same manner and on the same principle as in the "Davy Safety Lamp," so as to prevent any liability of firing back.

If the vapor is required for illuminating purposes, it is passed down a pipe, M, and through a second carbureting-vessel, N, containing benzine or other suitable hydrocarbon oil, by which means its illuminating-power is increased. The bottom of the pipe T, leading from the vessel N, is provided with wire-gauze to prevent firing back. There may be any desired number of vessels A and N in series, in order to carburet the air to any desired extent.

If by any means the air passing through the pipe J should contain moisture which should condense in the pipe, it can be let out by the tap P. In case any water should enter into the sealed oil-vessel A it will flow out beneath through a pipe, m, to a small vessel, R, from which it may be let out by a tap, n. This vessel R is provided with a water-gage, S, to show the quantity of water accumulated in the said vessel.

I am aware that hydrocarbon gas or air gas has been made by drying air by passing it over lime, &c., and then passing the dried air through the hydrocarbon liquid. I am also aware that air has been first heated and then passed through lime to dry it and then passed through the hydrocarbon liquid; but I am not aware that air has been first dried and subsequently heated or superheated before being passed through the hydrocarbon liquid. It is very important that the air shall be thoroughly dehydrated in order that it shall be highly absorptive of the hydrocarbon liquid, and to prevent the obstruction of the pipes by the condensation of water in them. It is practically impossible to dehydrate the air after it has been superheated, for which reason I first dehydrate it and then superheat it. The degree of heat to which I subject the air is considerably above that which has been heretofore imparted to it in those processes wherein it was subsequently dehydrated. In fact, in such instances it has been barely more than warmed.

I claim as my invention—

1. The apparatus for carbureting air, consisting of the combination of a blower, an air-dehydrating vessel containing a moisture-absorbing substance arranged to come in contact with the air during the passage of the latter through the vessel, an air-heating vessel connected to said dehydrating-vessel and constructed to heat the air during its passage, and a carbureting-vessel connected to said heating-vessel and constructed to cause the air to pass in bubbles through a hydrocarbon liquid, whereby the air forced by said blower through the successive vessels is first dehydrated, then heated, and finally carbureted, substantially as set forth.

2. A carbureting-vessel consisting of an inner oil-vessel and an outer water-vessel, arranged to form an intervening water space or jacket, an air-inlet pipe entering the bottom of said oil-vessel, a gas-outlet pipe leading from the top thereof, a water-chamber beneath the oil-vessel and communicating therewith through a tube, and a drainage-cock for drawing off the water from said chamber, substantially as set forth.

3. A carbureting-vessel consisting of an inner oil-vessel, A, an outer water-vessel, B, with an intervening water space or jacket, a perforated air-inlet pipe, J, entering said oil-vessel at the bottom, a gas-outlet pipe leading from the top of said oil-vessel, a water-chamber, R, beneath said water-vessel, a tube, m, connecting said chamber with the bottom of the oil-vessel in order to drain water from the latter, a gage, S, applied to said water-chamber, and a drainage-cock for drawing off the water therefrom, substantially as set forth.

4. The combination of a blower, an air-dehydrating vessel, D, constructed with perforated shelves f f therein, for holding a moisture-absorbing substance, and with air-inlet thereto at the bottom and air-outlet therefrom at the top, the heating-vessel E, with a coil of air-pipe, F, within it, leading from said air-outlet, and steam-pipes H and G, whereby steam is admitted to said vessel around said coil, the air-pipe J, leading from said coil and entering the bottom of the carbureting-vessel A, and the said carbureting-vessel having transverse foraminous partitions a a within it, for distributing the ascending air, substantially as set forth.

5. The combination of blower I, air-dehydrator D, containing a moisture-absorbent, air-heater E, carburetor A, and their connecting pipes, terminating in the bottom of the carburetor, with the water-vessel B, surrounding the carburetor and forming an intervening water space or jacket, the carburetor N, and the vapor-pipe leading from the carburetor A and entering the carburetor N, and wire-gauze partitions in said pipe between the two carburetors.

In witness whereof I have hereunto signed my name in the presence of two subscribing witnesses.

THOMAS DRAKE.

Witnesses:
 C. W. WHITMAN,
 *United States Consular Agent at Huddersfield.*
 A. B. CROSSLEY,
 *Market Place, Huddersfield.*